(12) United States Patent
Jeon et al.

(10) Patent No.: US 10,935,128 B2
(45) Date of Patent: Mar. 2, 2021

(54) APPARATUS AND METHOD FOR CONTROLLING TRANSMISSION OF VEHICLE

(71) Applicants: Hyundai Motor Company, Seoul (KR); KIA Motors Corporation, Seoul (KR)

(72) Inventors: Byeong Wook Jeon, Seoul (KR); Dong Hoon Jeong, Hwaseong-si (KR); Jae Chang Kook, Hwaseong-si (KR); Kwang Hee Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/662,319

(22) Filed: Oct. 24, 2019

(65) Prior Publication Data
US 2020/0408299 A1 Dec. 31, 2020

(30) Foreign Application Priority Data
Jun. 27, 2019 (KR) .................. 10-2019-0077287

(51) Int. Cl.
| | |
|---|---|
| *B60W 10/10* | (2012.01) |
| *F16H 61/02* | (2006.01) |
| *B60W 30/18* | (2012.01) |

(52) U.S. Cl.
CPC ....... *F16H 61/0213* (2013.01); *B60W 30/181* (2013.01); *B60W 10/10* (2013.01);
(Continued)

(58) Field of Classification Search
CPC ........... F16H 2312/00; F16H 2312/16; B60W 10/10; B60W 30/18072; B60W 30/181;
(Continued)

(56) References Cited

U.S. PATENT DOCUMENTS

| | | | |
|---|---|---|---|
| 9,896,106 B1* | 2/2018 | Wrobel | ................. B60W 50/14 |
| 2011/0307122 A1* | 12/2011 | Kanning | ......... B60W 30/18072 |
| | | | 701/1 |

(Continued)

FOREIGN PATENT DOCUMENTS

| | | |
|---|---|---|
| JP | 5273013 B | 8/2013 |
| KR | 10-2017-0030543 A | 3/2017 |
| KR | 10-2018-0113748 A | 10/2018 |

*Primary Examiner* — Roger L Pang
(74) *Attorney, Agent, or Firm* — Brinks Gilson & Lione (57) ABSTRACT

An apparatus and a method for controlling a transmission of a vehicle are provided. The apparatus includes a determination device to determine whether to perform speed following control based on state information of a traffic light positioned on a road in front of the vehicle in coasting, a stop position predicting device to predict a stop position of the vehicle based on position information of the vehicle and the traffic light, a transmission stage decision device to determine a target position and a target speed based on the predicted stop position and to form a speed profile for each transmission stage to determine a final transmission stage based on the target position and the target speed, and a controller to perform speed following transmission control based on the final transmission stage.

26 Claims, 8 Drawing Sheets

(52) U.S. Cl.
CPC . *B60W 30/18072* (2013.01); *B60W 30/18154* (2013.01); *B60W 2554/402* (2020.02); *B60W 2554/80* (2020.02); *B60W 2554/802* (2020.02); *B60W 2556/45* (2020.02); *B60W 2710/10* (2013.01); *F16H 2061/0237* (2013.01); *F16H 2312/16* (2013.01)

(58) Field of Classification Search
CPC ....... B60W 30/1854; B60W 2554/802; B60W 2556/45; B60W 2710/10; B60W 2554/80; B60W 2554/402
USPC .............................................. 701/55, 65, 66
See application file for complete search history.

(56) References Cited

U.S. PATENT DOCUMENTS

| | | | |
|---|---|---|---|
| 2017/0043776 A1* | 2/2017 | Sujan | F02D 41/021 |
| 2017/0158204 A1 | 6/2017 | Roos et al. | |
| 2018/0154898 A1* | 6/2018 | Wrobel | B60W 10/26 |
| 2018/0290654 A1 | 10/2018 | Jeon et al. | |
| 2019/0210604 A1* | 7/2019 | Limbacher | B60W 30/18127 |
| 2019/0375403 A1* | 12/2019 | Hu | B60W 30/143 |
| 2020/0130686 A1* | 4/2020 | Kim | G06K 9/00825 |

\* cited by examiner

| PRESENT SIGNAL | PREDICTED NEXT SIGNAL (UNTIL VEHICLE ARRIVES AT STOP POSITION) | TRAFFIC LIGHT SIGNAL CHANGE CONDITION | TRANSMISSION CONTROL | | REMARK |
|---|---|---|---|---|---|
| | | | SPEED FOLLOW CONTROL | NEUTRAL DRIVING | |
| RED | RED | — | PERFORMED | SELECTIVELY ALLOWED (WHEN TARGET SPEED IS NECESSARY FOR BEING FOLLOWD) | — |
| RED | GREEN | PREDICTED TO BE CHANGED TO BE GREEN LAMP AT PREDICTED TIME FOR ARRIVAL AT STOP POSITION OR THEREAFTER ($T_{STOP} \leq T_{GREEN}$) | PERFORMED | SELECTIVELY ALLOWED (WHEN TARGET SPEED IS NECESSARY FOR BEING FOLLOWD) | — |
| RED | GREEN | PREDICTED TO BE CHANGED TO BE GREEN LAMP BEFORE PREDICTED TIME FOR ARRIVAL AT STOP POSITION ($T_{STOP} > T_{GREEN}$) | NOT PERFORMED | PROHIBITED (TILL POSITION OF TRAFFIC LIGHT) | CORRESPONDING TO RE-ACCELERATION PREDICTED |
| GREEN | RED | PREDICTED TO BE CHANGED TO BE RED LAMP BEFORE PREDICTED TIME FOR ARRIVAL AT STOP POSITION ($T_{STOP} > T_{RED}$) | PERFORMED | SELECTIVELY ALLOWED (WHEN TARGET SPEED IS NECESSARY FOR BEING FOLLOWD) | PERFORMED UNDER CONDITION OF $T_{STOP} \gg T_{RED}$ |
| GREEN | RED | PREDICTED TO BE CHANGED TO BE RED LAMP AT PREDICTED TIME FOR ARRIVAL AT STOP POSITION OR THEREAFTER ($T_{STOP} \leq T_{RED}$) | NOT PERFORMED | CONSTANTLY ALLOWED | — |
| GREEN | GREEN | — | NOT PERFORMED | CONSTANTLY ALLOWED | — |

(PREDICTED TIME FOR ARRIVAL AT STOP POSITION: $T_{STOP}$, REMAINING GREEN LAMP TIME: $T_{GREEN}$, REMAINING RED LAMP TIME $T_{RED}$)

APPARATUS AND METHOD FOR CONTROLLING TRANSMISSION OF VEHICLE

CROSS-REFERENCE TO RELATED APPLICATION

This application claims priority to and the benefit of Korean Patent Application No. 10-2019-0077287, filed on Jun. 27, 2019, which is incorporated herein by reference in its entirety.

FIELD

The present disclosure relates to an apparatus and a method for controlling transmission of a vehicle.

BACKGROUND

The statements in this section merely provide background information related to the present disclosure and may not constitute prior art.

An automatic transmission system of a vehicle determines a transmission start time point based on a gear shifting pattern of the vehicle and determines, as a transmission end time point, a time point at which the hydraulic control of a clutch is terminated.

In general, when the vehicle is decelerated from the high speed to the low speed, the vehicle performs automatic gear shifting from a higher transmission stage to a lower transmission stage. This gear shifting schedule is determined by a gear shifting determining map for a preset vehicle speed. In this case, the gear shifting schedule may be set to satisfy an engine RPM (revolution per minute) capable of maintaining a fuel cut-off state of the engine during braking and decelerating in coasting, without pressing the accelerator pedal.

However, we have discovered that when the engine becomes in the fuel cut-off state, the vehicle becomes in an engine back-driving state, that is, an engine brake state, so the deceleration of the vehicle is increased. Accordingly, the vehicle may be stopped at a position earlier than an expected stop position. In this case, the driver has to press the accelerator pedal to adjust the stop position of the vehicle.

As described above, in gear shifting based on a conventional gear shifting schedule, fuel loss resulting from re-acceleration of the vehicle more occurs rather than fuel-saving by the fuel cut-off.

The above information disclosed in this Background section is only for enhancement of understanding of the background of the present disclosure, and therefore it may contain information that does not form the prior art that is already known to a person of ordinary skill in the art.

SUMMARY

The present disclosure relates to a vehicle control system and its method controlling a transmission of the vehicle for saving fuel.

An aspect of the present disclosure provides an apparatus and a method for controlling a transmission of a vehicle, capable of estimating a stop position in advance depending on the situation in front of the vehicle in deceleration, forming the optimal speed profile for arriving at the predicted stop position, and performing the transmission control to follow the speed profile, thereby decelerating the vehicle to the predicted stop position in the most effective fuel efficiency without re-acceleration.

Another aspect of the present disclosure provides an apparatus and a method for controlling a transmission of a vehicle, capable of exactly predicting a position by predicting a stop position of a vehicle, based on the state of a traffic light in front of the vehicle, the position of the traffic light, or the position of a preceding vehicle through vehicle to infrastructure (V2I) communication.

According to an aspect of the present disclosure, an apparatus for controlling a transmission of a vehicle includes a determination device to determine whether to perform speed following control based on state information of a traffic light positioned on a road in front of the vehicle in coasting, a stop position predicting device to predict a stop position of the vehicle based on position information of the vehicle and the traffic light, a transmission stage decision device to determine a target position and a target speed based on the predicted stop position, and to form a speed profile for each transmission stage to determine a final transmission stage based on the target position and the target speed, and a controller to perform speed following transmission control based on the final transmission stage.

The determination device determines whether to perform speed following control or neutral driving control by considering a predicted time at which the vehicle arrives at the stop position and a predicted time at which a state of the traffic light is switched based on state information of a present traffic light, state information of a next traffic light, and a distance between the vehicle and the traffic light.

The determination device determines the speed following control to be performed and the neutral driving control to be selectively allowed when a present signal of the traffic light is in red and a predicted next signal of the traffic light is in red.

The determination device determines the speed following control to be performed and the neutral driving control to be selectively allowed when a present signal of the traffic light is in red, a predicted next signal of the traffic light is in green, and a predicted time in which the vehicle arrives at the stop position is shorter than or equal to a predicted time in which the traffic light is changed to be in green.

The determination device determines the speed following control to be performed and the neutral driving control to be selectively allowed when a present signal of the traffic light is in green, a predicted next signal of the traffic light is in red, and a predicted time in which the vehicle arrives at the stop position is longer than a predicted time in which the traffic light is changed to be in red.

The determination device determines the speed following control not to be performed and the neutral driving control to be prohibited when a present signal of the traffic light is in red, a predicted next signal of the traffic light is in green, and a predicted time in which the vehicle arrives at the stop position is longer than a predicted time in which the traffic light is changed to be in green.

The determination device determines the speed following control not to be performed and the neutral driving control to be constantly performed when a present signal of the traffic light is in green, a predicted next signal of the traffic light is in red, and a predicted time in which the vehicle arrives at the stop position is shorter than or equal to a predicted time in which the traffic light is changed to be in red.

The determination device determines the speed following control not to be performed and the neutral driving control to be constantly performed when a present signal of the traffic light is in green and a predicted next signal of the traffic light is in green.

The stop position predicting device determines the distance between the vehicle and the traffic light as a predicted stop distance when there is no preceding vehicle between the vehicle and the position of the traffic light, and determines the predicted stop position based on the predicted stop distance.

The stop position predicting device determines the distance between the vehicle and a preceding vehicle as a predicted stop distance when there is the preceding vehicle between the vehicle and the position of the traffic light, and determines the predicted stop position based on the predicted stop distance.

The transmission stage decision device sets, as the target position, a position obtained by subtracting an offset distance from the predicted stop position.

The transmission stage decision device determines, the final transmission stage, a transmission stage corresponding to the target position and the target speed in the speed profile for the each transmission stage.

The controller performs the neutral control from a present position of the vehicle to a predicted gear shifting position and performs gear shifting depending on the determined final transmission stage when the vehicle arrives at the predicted gear shifting position.

The vehicle includes an automatic transmission, a continuously variable transmission (CVT), or a multi-stage reducer.

According to another aspect of the present disclosure, a method for controlling a transmission of a vehicle includes determining whether to perform speed following control based on state information of a traffic light positioned on a road in front of the vehicle in coasting, predicting a stop position of the vehicle based on position information of the vehicle and the traffic light, determining a target position and a target speed based on the predicted stop position, forming a speed profile for each transmission stage to determine a final transmission stage based on the target position and the target speed, and performing speed following transmission control based on the final transmission stage.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing the components of the form according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application FIG. 1 is a view illustrating a system employing an apparatus for controlling the transmission of a vehicle according to a form of the present disclosure.

Figure 1:
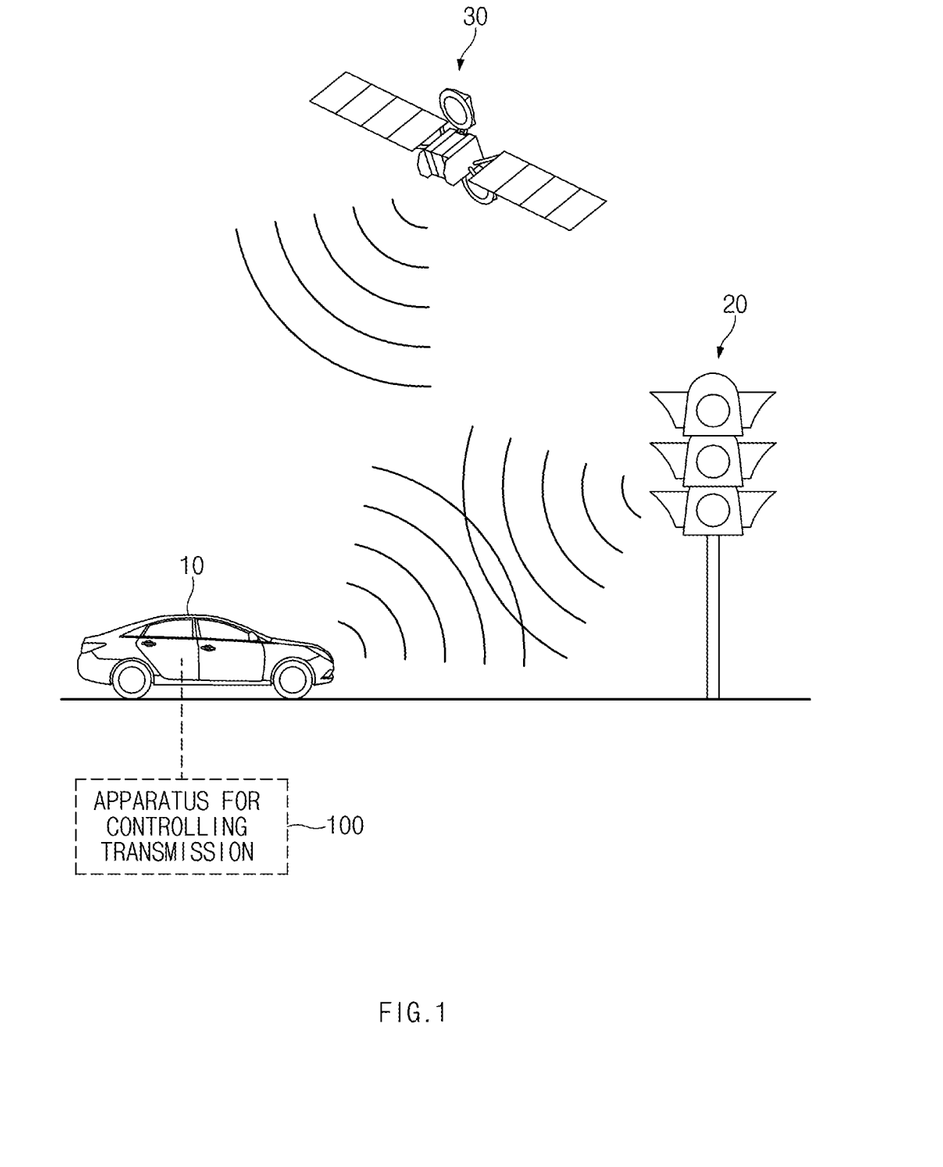
FIG. 1 is a view illustrating a system employing an apparatus for controlling the transmission of a vehicle according to a form of the present disclosure.

Referring to FIG. 1, the apparatus 100 for controlling the transmission of the vehicle may be implemented in a vehicle 10. In addition, the apparatus 100 for controlling the transmission of the vehicle may be formed integrally with the internal control units of the vehicle or may be implemented separately from the internal control units of the vehicle to be connected with the internal control units of the vehicle through a separate connector.

In addition, according to a form of the present disclosure, the apparatus 100 for controlling the transmission of the vehicle 10 may be applied to a vehicle including an automatic transmission, a vehicle including a continuously variable transmission (CVT) and/or a vehicle including a reducer (or a multi-stage reducer).

Referring to FIG. 1, the apparatus 100 for controlling the transmission of the vehicle may make vehicle to infrastructure (V2I) communication with a traffic light (or a traffic light controller) positioned within a specific distance and may receive state information of the traffic light (or the traffic light controller) from the traffic light (or the traffic light controller).

In this case, the state information of the traffic light may include information, such as information on an On/Off state of a present traffic light, information on an On/Off state of a next traffic light, and information on a traffic light change time.

In addition, the apparatus 100 for controlling the transmission of the vehicle may receive position information of the vehicle and road information through the global positioning system (GPS) communicating with the satellite.

In this case, the road information may include the remaining distance to a front traffic light and the curvature or the gradient of the road in front of the vehicle.

The apparatus 100 for controlling the transmission of the vehicle may include a separate global positioning system (GPS) module and may receive a satellite signal through the GPS module. Meanwhile, the apparatus 100 for controlling the transmission of the vehicle may receive the satellite signal through the navigation device provided in the vehicle.

Accordingly, the apparatus 100 for controlling the transmission of the vehicle may predict a stop position of the vehicle based on state information of the traffic light, the position information of the vehicle, and the information on the road in front of the vehicle, may configure the speed profile based on the stop position, and may control the transmission of the vehicle based on the speed profile.

Accordingly, the detailed components of the apparatus 100 for controlling the transmission of the vehicle will be described with reference to FIG. 2.

Figure 2:
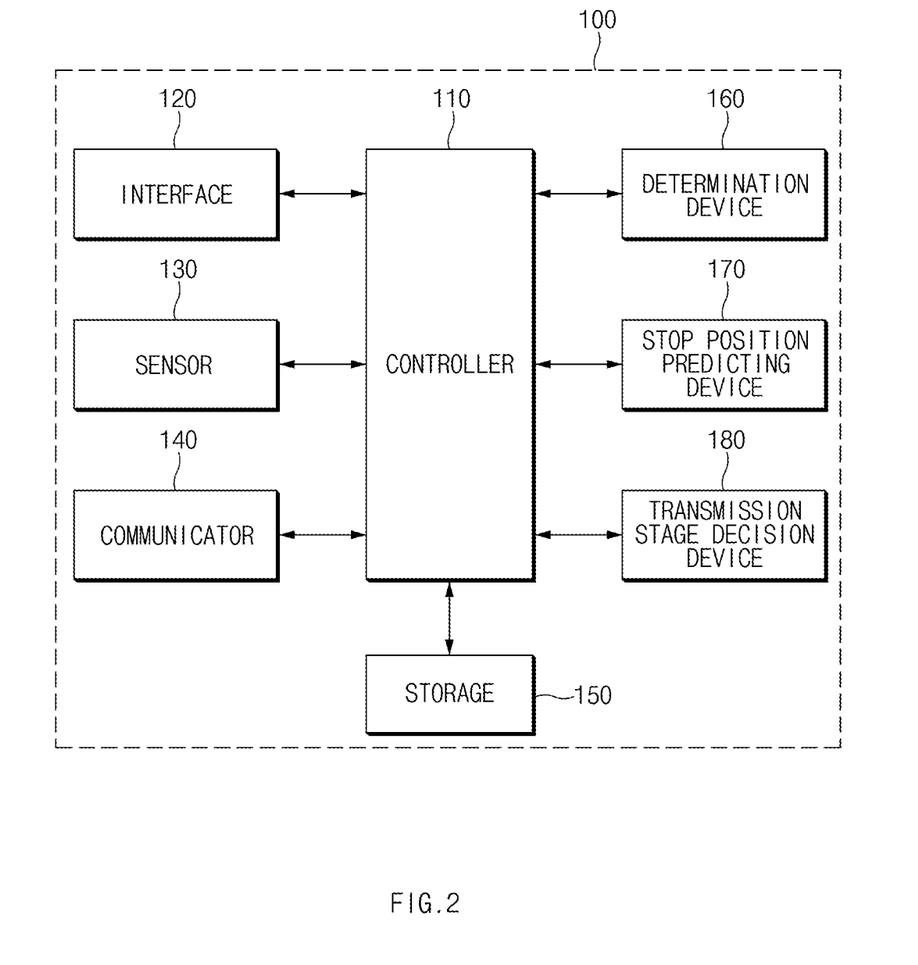
FIG. 2 is a block diagram illustrating the configuration of the apparatus for controlling the transmission of the vehicle according to a form of the present disclosure.

FIG. 2 is a block diagram illustrating the configuration of the apparatus 100 for controlling the transmission of the vehicle, according to a form of the present disclosure.

Referring to FIG. 2, the apparatus 100 for controlling the transmission of the vehicle may include a controller 110, an interface 120, a sensor 130, a communicator 140, a storage 150, a determination device 160, a stop position predicting device 170, and a transmission stage decision device 180. According to a form of the present disclosure, the controller 110, the determination device 160, the stop position predicting device 170, and the transmission stage decision device 180 in the apparatus 100 for controlling the transmission of the vehicle may be implemented with at least one processor. In addition, the controller 110 may be implemented in the form of including the determination device 160, the stop position predicting device 170, and the transmission stage decision device 180.

The controller 110 may process signals transmitted between the components of the apparatus 100 for controlling the transmission of the vehicle.

The interface 120 may include an input device to receive a control command from a user, and an output device to output the operation state and the operation result of the apparatus 100.

In this case, the input device may include a key button, and may include a mouse, a joystick, a jog shuttle, a stylus pen, or the like. In addition, the input device may include a soft key implemented on a display.

The output device may include the display and may include a voice output device such as a speaker. In the case that a touch sensor product, such as a touch film, a touch sheet, a touch pad, or the like, is included in the display, the display may operate as a touch screen, and the input device and the output device may be implemented in the integral form In this case, the display may include at least one of a liquid crystal display (LCD), a thin film transistor-liquid crystal display (TFT LCD), an organic light-emitting diode (OLED), a flexible display, a field emission display (FED), and/or a three dimensional display (3D display)

The sensor 130 may include one or more sensors that detect an obstacle, such as an advance vehicle, positioned around the vehicle and measure a distance to the obstacle and/or a relative speed with respect to the obstacle. For example, the sensor 130 may include a radar, an ultrasonic sensor, a scanner, and/or a camera. In addition, various sensors may be employed as long as the sensors may detect the obstacles and measure the distances.

Meanwhile, the sensor 130 may further include sensors to measure the speed of the vehicle.

The communicator 140 may include a communication module which supports a communication interface with electronic parts and/or control units provided in a vehicle. For example, the communication module may be connected with a navigation provided in the vehicle through communication and may receive position information of a host vehicle and/or the position information of the front traffic light from the navigation.

In this case, the vehicle network communication technology may include a controller area network (CAN) communication technology, a local interconnect network (LIN) communication technology, and a FlexRay communication technology.

In addition, the communicator 140 may include a communication module to make V2I communication with the front traffic light (or a traffic light controller). In this case, the communication module may make V2I communication through a wireless Internet access or a short range communication technology.

The wireless Internet technology may include a wireless LAN (WLAN), a wireless broadband (Wibro), a Wi-Fi, World Interoperability for Microwave Access (Wimax). The short-range communication technology may include Bluetooth, ZigBee, ultra wideband (UWB), radio frequency identification (RFID), or infrared data association (IrDA).

The storage 150 may store data and/or algorithms necessary for the apparatus 100 for controlling the transmission of the vehicle to operate.

For example, the storage 150 may store the position information of the vehicle, the information on the road in front of the vehicle, or the position information of the front traffic light, which is received through the navigation. In addition, the storage 150 may store information on the state of the front traffic light, which is received through the V2I communication. In addition, the storage 150 may store information on a front obstacle, for example, a preceding vehicle, which is detected by the sensor 130.

In addition, the storage 150 may store a command and/or algorithm to perform the transmission control by determining whether speed following control or driving control (hereinafter, referred to as "neutral driving control") on a neutral gear is performed, predicting the stop position of the vehicle, and forming the speed profile, based on the state information and the position information of the front traffic light and the information of the preceding vehicle.

In this case, the storage 150 may include a storage medium, such as a random access memory (RAM), a static random access memory (SRAM), a read only memory (ROM), a programmable read-only memory (PROM), an electrically erasable programmable read-memory, or the like.

The determination device 160 may determine whether to perform a speed following control or a neutral driving control, based on the state information of the traffic light positioned on a road in front of the vehicle.

The determination device 160 may determine whether to perform the speed following control or the neutral driving control by considering a predicted time at which the vehicle arrives at the stop position and a predicted time at which the state of the traffic light is switched based on the state information of a present traffic light, the state information of a next traffic light, and the distance between the vehicle and the traffic light.

Figure 3:
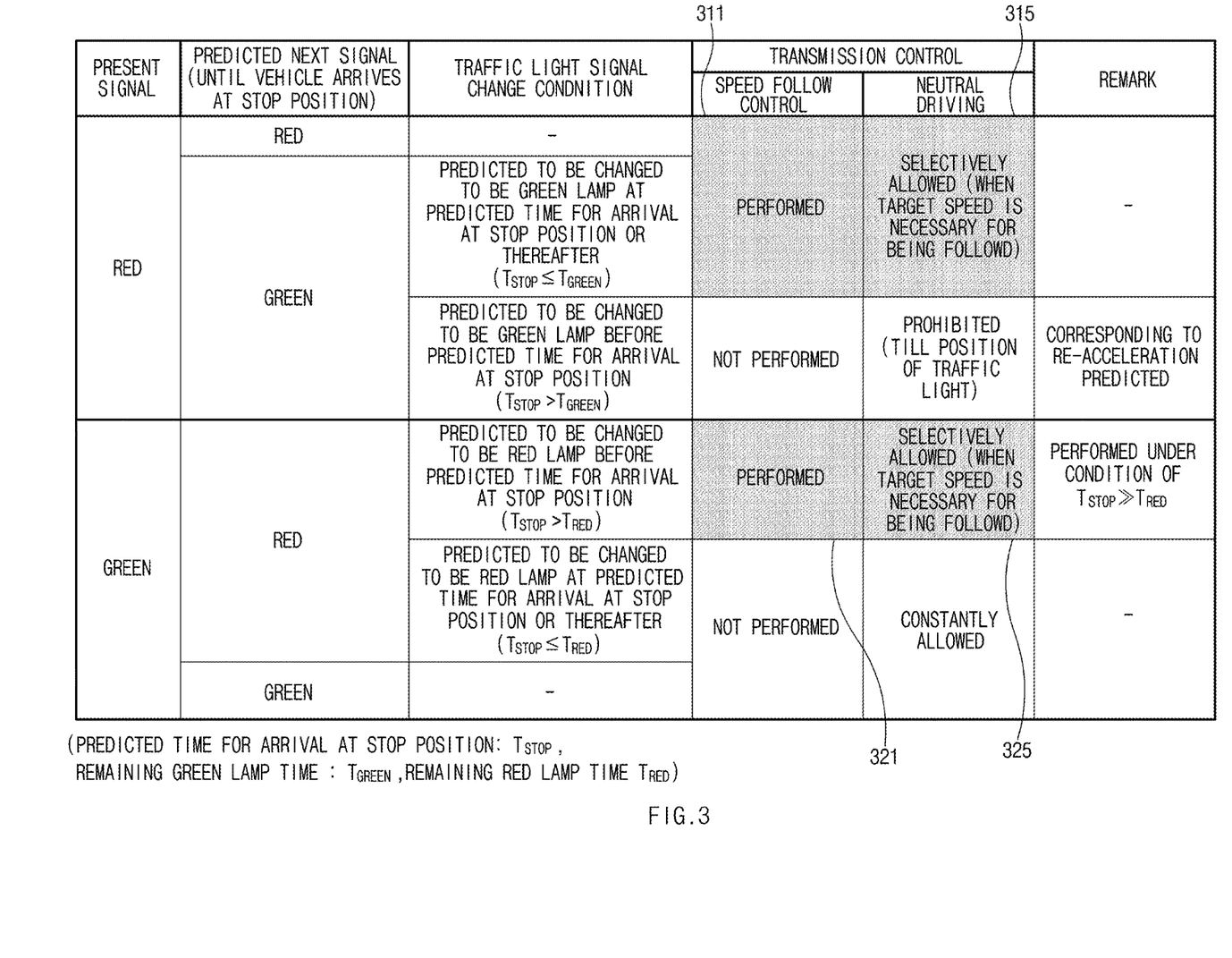
FIG. 3 is a view illustrating a speed profile according to a form of the present disclosure.

For example, the determination device 160 may determine whether to perform the speed following control or the neutral driving control based on a reference table illustrated in FIG. 3.

The reference table illustrated in FIG. 3 has information defined regarding whether the speed following control is performed and whether the neutral driving control is allowed or prohibited, based on the present signal of a traffic light, the predicted next signal when the vehicle arrives at the stop position, or a signal changing condition.

As illustrated in FIG. 3, the determination device 160 may perform the speed following control (see reference number 311) and selectively allow the neutral driving control (see reference number 315), based on the reference table when the present signal of the traffic light is in red, and a predicted next signal is in red.

Alternatively, the determination device 160 may perform the speed following control (see reference number 311) and selectively allow the neutral driving control (see reference number 315), based on the reference table, when the present signal of the traffic light is in red, the predicted next signal is in green, and the traffic light is predicted to be changed to be in green at the predicted time for the vehicle to arrive at the stop position, or thereafter, for example, when the predicted time TSTOP for the vehicle to arrive at the stop position is equal to or shorter than the predicted time TGREEN for the traffic light to be changed to be in green.

Meanwhile, the determination device 160 may determine, based on the reference table, that the speed following control is not performed and the neutral driving control is prohibited, when the present signal of the traffic light is in red, when the predicted next signal is in green, and when the color of the traffic light is predicted to be changed to be in green before the predicted time for the vehicle to arrive at the stop position, for example, when the predicted time TSTOP for the vehicle to arrive at the stop position is longer than the predicted time TGREEN for the color of the traffic light to be changed to be in green.

Alternatively, the determination device 160 may perform the speed following control (see reference number 321) and selectively allow the neutral driving control (see reference number 325), based on the reference table, when the present signal of the traffic light is in green, when the predicted next signal is in red, and when the traffic light is predicted to be changed to be in red before the predicted time for the vehicle to arrive at the stop position, for example, when the predicted time TSTOP for the vehicle to arrive at the stop position is equal to or longer than the predicted time TRED for the traffic light to be changed to be in red.

Alternatively, the determination device 160 may NOT perform the speed following control (see reference number 311) and constantly allow the neutral driving control (see reference number 315), based on the reference table, when the present signal of the traffic light is in green, when the predicted next signal is in red, and when the traffic light is predicted to be changed to be in red after the predicted time for the vehicle to arrive at the stop position, for example, when the predicted time TSTOP for the vehicle to arrive at the stop position is equal to or shorter than the predicted time TRED for the traffic light to be changed to be in red.

In addition, the determination device 160 may not perform the speed following control and constantly allow the neutral driving control based on the reference table, when the present signal of the traffic light is in green and when the predicted next signal is in green.

The stop position predicting device 170 predicts the stop position of the vehicle.

Figure 4A:
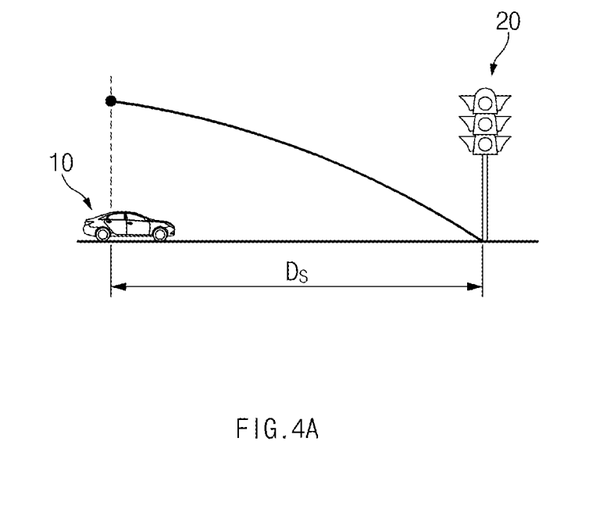
FIGS. 4A and 4B are views illustrating the operations of estimating a stop position of the apparatus for controlling the transmission of the vehicle according to a form of the present disclosure.

In FIG. 4A, according to a form of the present disclosure, the stop position predicting device 170 predicts the stop position of the vehicle when approaching the position of a traffic light, based on position information of the vehicle and the traffic light, that is, the distance information between the vehicle and the traffic light.

Referring to FIG. 4A, when there is absent a preceding vehicle between the vehicle 10 and the front traffic light 20, the stop position predicting device 170 determines the distance between the vehicle 10 and the traffic light 20 as a predicted stop distance Ds and determines the predicted stop position based on the predicted stop distance Ds. In this case, the predicted stop position may be a position of the traffic light or a position around the position of the traffic light.

Figure 4B:
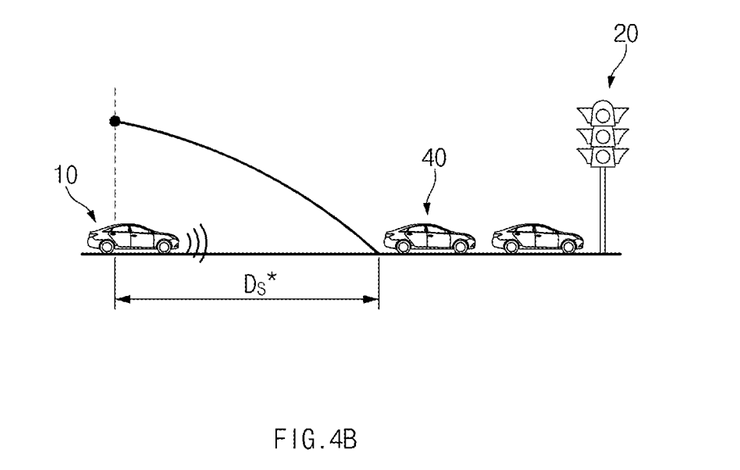

In FIG. 4B, according to a form of the present disclosure, the stop position predicting device 170 may predict the stop position when approaching the position of the traffic light, based on the distance information between the vehicle and the traffic light, whether there is absent the preceding vehicle, and the distance information between the vehicle and the preceding vehicle.

Referring to FIG. 4B, the stop position predicting device 170 determines the distance between the vehicle 10 and a preceding vehicle 40 as a predicted stop distance Ds* and determines a predicted stop position based on the predicted stop distance Ds*, when there is present the preceding vehicle 40 until the vehicle 10 arrives at the position of the front traffic light 20. In this case, the predicted stop position may be a position of a rear end of the preceding vehicle 40 closest to the vehicle or a position close to the position of the rear end of the preceding vehicle 40.

The transmission stage decision device 180 sets a target distance DT and a target speed VT based on a predicted stop position when the predicted stop position is determined by the stop position predicting device 170. In this case, the target distance DT may be set to a value obtained by subtracting an offset distance Doffset from the predicted stop distance DS.

In other words, when the predicted stop position is the position of the traffic light, the transmission stage decision device 180 may set the target distance DT to a value obtained by subtracting the offset distance from the distance between the vehicle and the traffic light.

Meanwhile, when the predicted stop position is the position of the preceding vehicle, the transmission stage decision device 180 may set, as the target distance DT, a value obtained by subtracting the offset distance from the distance between the vehicle and the preceding vehicle.

In this case, the transmission stage decision device 180 may form a speed profile for each transmission stage based on the set target position and the target speed, and may determine, as the final transmission stage, a transmission stage corresponding to the target speed at the target position.

The form relevant thereto will be described with reference to FIG. 5.

Figure 5:
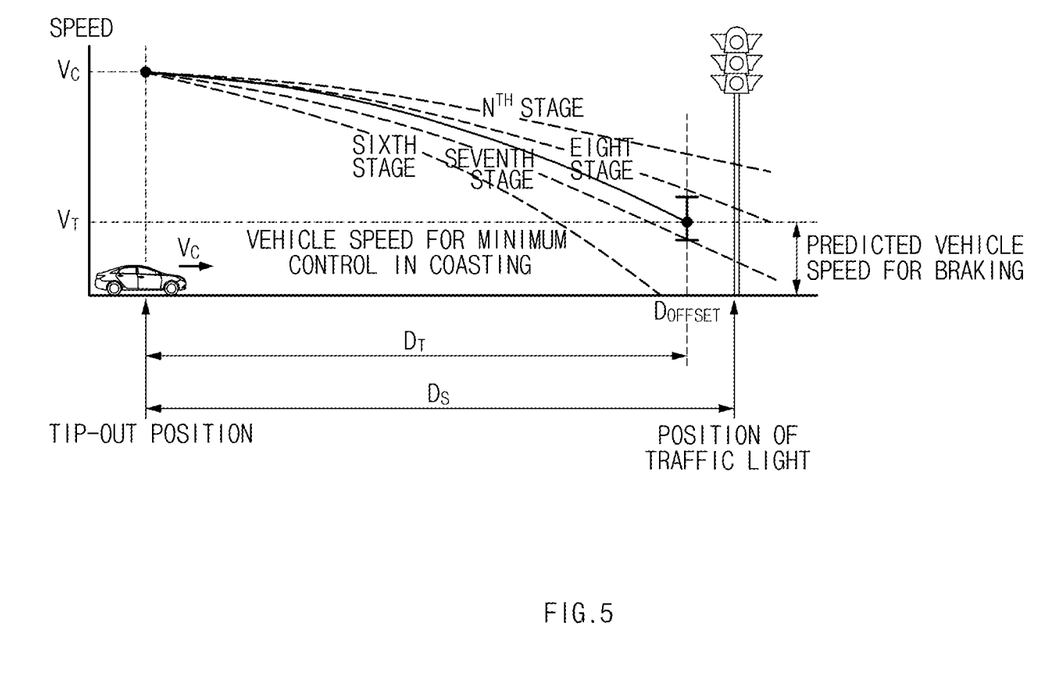
FIG. 5 is a view illustrating the operation of determining the final transmission stage depending on the speed profile according to a form of the present disclosure.

Referring to FIG. 5, the transmission stage decision device 180 determines a transmission stage corresponding to a target speed VT at a target position based on a speed profile for each transmission stage. In FIG. 5, since the target speed is between the seventh stage and eighth stage, the transmission stage decision device 180 may determine the final transmission stage to the seventh stage.

In this case, the controller 110 may control the transmission such that the speed profile is followed based on the final transmission stage determined by the transmission stage decision device 180. Accordingly, the vehicle may be stopped at the predicted stop position without performing acceleration again.

In this case, the controller 110 may control the transmission such that the speed profile is followed based on the final transmission stage determined by the transmission stage decision device 180.

The operation of controlling the transmission of the vehicle according to a form will be described with reference to FIG. 6.

Figure 6:
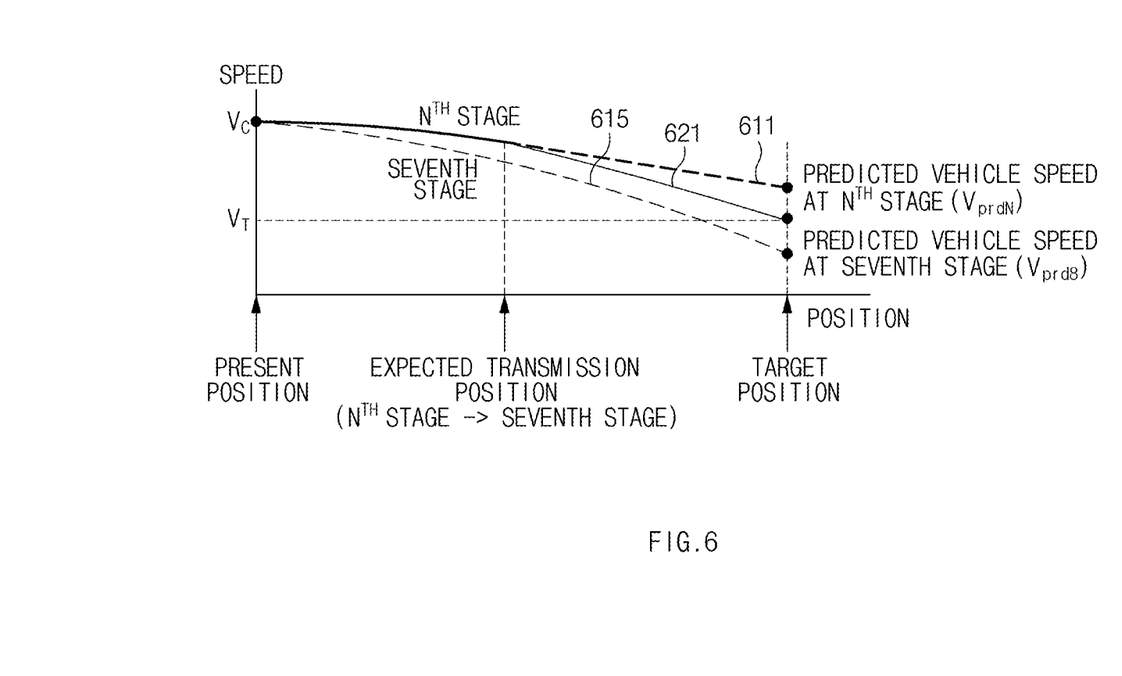
FIG. 6 is a view illustrating the operation of controlling the transmission according to a form of the present disclosure.

Referring to FIG. 6, reference numeral 611 represents the speed change graph to the target position in driving at seventh stage based on the present vehicle speed at the present position. In addition, reference numeral 621 represents the speed change graph in driving based on the speed variation pattern according to the present disclosure.

As in the graph represented by reference numeral 621, the controller 110 performs neutral control to the predicted gear shifting position from the present position of the vehicle 10. When the vehicle 10 arrives at the predicted gear shifting position, the controller 110 controls gear shifting from the Nth stage to the seventh stage. In this case, the predicted gear shifting position may be determined to a deceleration start position in which the predicted speed at the target position is the target speed when deceleration is started based on the speed profile corresponding to the seventh stage.

Accordingly, the controller 110 performs the deceleration controlling such that the speed Vc of the vehicle 10 reaches the target speed at the target position while maintaining the seventh stage from the predicted gear shifting position to the target position. Accordingly, the vehicle 10 may be stopped at the predicted stop position without the excessive re-acceleration.

According to a form of the present disclosure, the apparatus 100 for controlling the transmission of the vehicle having the above operation may be implemented in the form of an independent hardware device including a memory and a processor to process each operation, and may be run in the form included in another hardware device such as a microprocessor or a general purpose computer system.

Figure 7A:
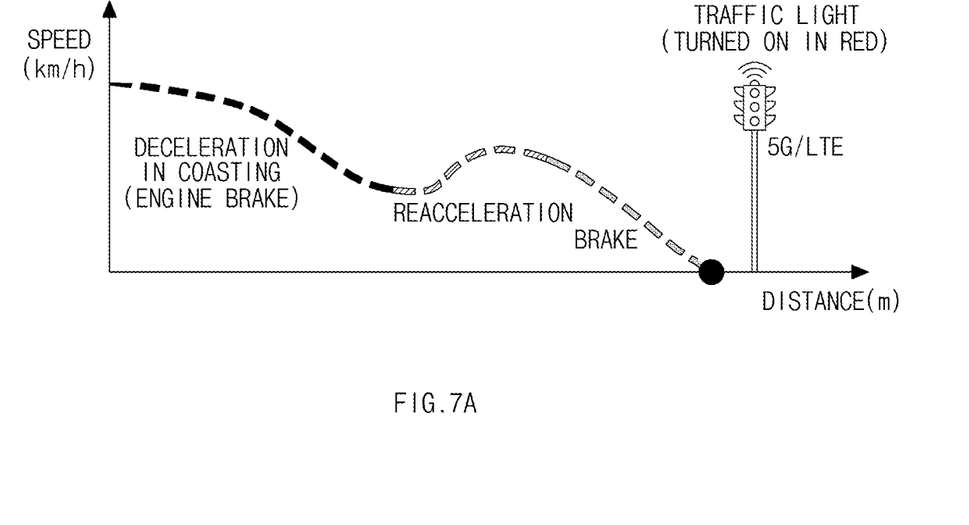
FIGS. 7A and 7B are views illustrating the gear shifting patterns according to a form of the present disclosure.

FIG. 7A is a graph illustrating a stop pattern based on typical transmission control in coasting.

As illustrated in FIG. 7A, depending on the stop pattern based on the typical transmission control in coasting, as the deceleration is increased in the engine brake state, a driver presses an acceleration pedal again to perform acceleration again such that the vehicle is stopped at the target position. Accordingly, the fuel loss may occur due to the re-acceleration operation.

Figure 7B:
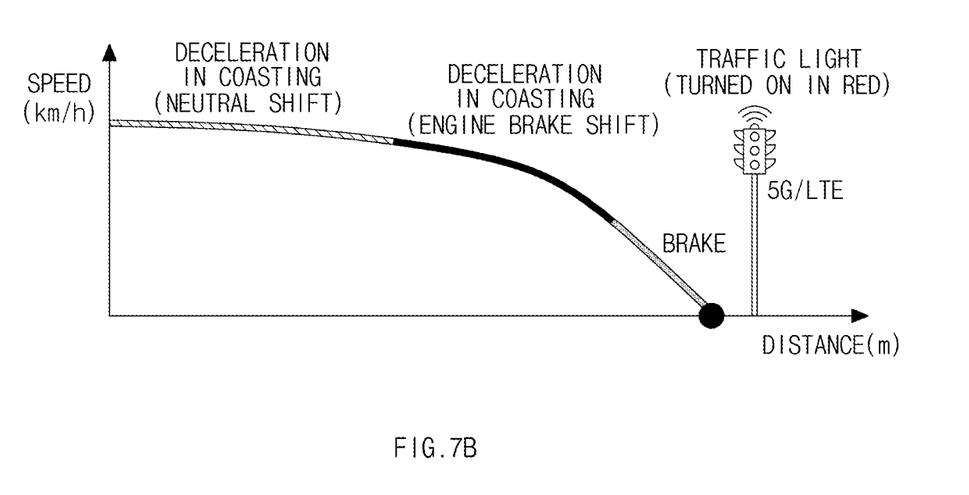

Meanwhile, FIG. 7B illustrates the comparison of the stop pattern based on the speed following control according to the present disclosure.

As illustrated in FIG. 7B, depending on the stop pattern based on the speed following control in coasting, the fuel is cut off after the neutral driving to perform the engine brake gear shifting. Therefore, as the vehicle is stopped at the target position without performing acceleration again, the fuel efficiency may be improved.

Figure 8:
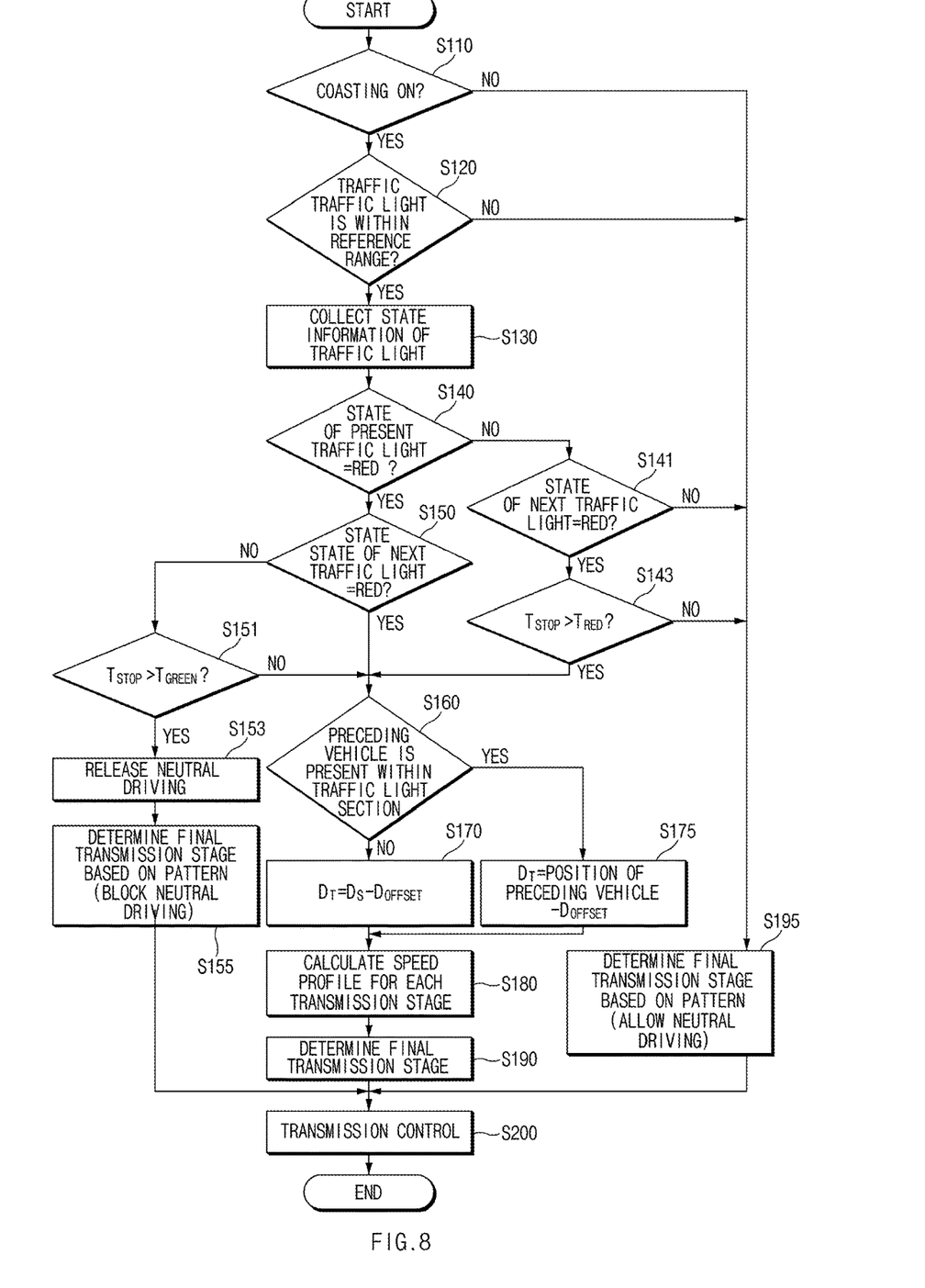
FIG. 8 is a flowchart illustrating a method for controlling the transmission of the vehicle, according to a form of the present disclosure.

The flowchart of the operation of the apparatus 100 according to a form of the present disclosure will be described below.

FIG. 8 is a flowchart illustrating a method for controlling the transmission of the vehicle, according to a form of the present disclosure.

Referring to FIG. 8, the apparatus 100 for controlling the transmission of the vehicle may determine whether there is a traffic light within a reference range from the vehicle (S120) when coasting becomes in an ON state as a brake becomes in an OFF state in the APS (Accelerator Position Sensor) OFF state (S110). The APS OFF state means that the accelerator pedal is not pressed. In this case, the apparatus 100 for controlling the transmission of the vehicle determines the final transmission stage based on an existing pattern when there is no traffic light within the reference range from the vehicle (S195) and performs gear shifting controlling (S200). In this case, the neutral driving for the vehicle may be allowed.

Meanwhile, the apparatus 100 for controlling the transmission of the vehicle collects the state information of the traffic light from the traffic light (or a traffic light controller) through the V2I communication, when there is the traffic light within the reference range from the vehicle (S130).

In this case, the apparatus 100 for controlling the transmission of the vehicle determines the state of a present traffic light and the state of a next traffic light, based on the state information of the traffic light collected in step S130.

In addition, the apparatus 100 for controlling the transmission of the vehicle determines the final transmission stage based on the existing pattern (S195) and performs transmission control (S200), when the state of the present traffic light is not red (S140) and the state of the next traffic light is not red (S141).

In addition, the apparatus 100 for controlling the transmission of the vehicle determines the final transmission stage based on the existing pattern (S195) and performs transmission control (S200), when the state of the present traffic light is not in red (S140), when the state of the next traffic light is in red (S141), when the predicted stop time TSTOP of the vehicle is equal to or shorter than the predicted time TRED in which the traffic light is changed to be in red (S143).

Meanwhile, the apparatus 100 for controlling the transmission of the vehicle performs the procedure after step S160 when the predicted stop time TSTOP of the vehicle is longer than the predicted time TRED in which the traffic light is changed to be in red in step 143.

In addition, the apparatus 100 for controlling the transmission of the vehicle performs the procedure after step S160 even when the state of the present traffic light is in red (S140) and even when the state of the next traffic light is in red.

In addition, the apparatus 100 for controlling the transmission of the vehicle performs the procedure after step S160 when the state of the present traffic light is in red (S140), when the state of the next traffic light is not in red (S150), and when the predicted stop time TSTOP of the vehicle is equal to or shorter than the predicted time TGREEN in which the traffic light is changed to be in green (S151).

The apparatus 100 for controlling the transmission of the vehicle determines whether there is the preceding vehicle in a section (or a space) between the vehicle and the traffic light in S160 and determines the preceding vehicle as being absent (S160) and sets, as the target distance DT, a value obtained by subtracting the offset distance DOFFSET from the predicted stop distance DS based on the position of the traffic light (S170). The apparatus 100 for controlling the transmission of the vehicle determines whether there is the preceding vehicle in a section (or a space) between the vehicle and the traffic light in S160, determines the preceding vehicle as being present (S160) and sets, as the target distance DT, a value obtained by subtracting the offset distance DOFFSET from the predicted stop distance Ds* based on the position of the preceding vehicle (S175).

When the target distance DT is set in S170 or S175, the apparatus 100 for controlling the transmission of the vehicle calculates the speed profile in each transmission stage (S180) and determines the final transmission stage corresponding to the target speed at the target position based on the speed profile calculated in step S180.

Accordingly, the apparatus 100 for controlling the transmission of the vehicle performs the transmission control of the vehicle based on the speed profile with respect to the final transmission stage determined in step S190.

The apparatus 100 for controlling the transmission of the vehicle determines the final transmission stage based on the existing pattern (S155) and performs transmission control (S200) when the state of the present traffic light is in red (S140), when the state of the next traffic light is not in red (S150), and when the predicted stop time TSTOP of the vehicle is longer than the predicted time TGREEN in which the traffic light is changed to be in green (S151). In this case, the neutral driving for the vehicle may be blocked.

As described above, according to the present disclosure, a stop position may be predicted in advance depending on the situation in front of the vehicle in deceleration, the optimal speed profile for arriving at the predicted stop position may be formed, and the gear shifting controlling to follow the speed profile may be performed, thereby decelerating the vehicle to the predicted stop position in the most effective fuel efficiency without re-acceleration of the vehicle.

According to the present disclosure, a position may be exactly predicted by predicting a stop position of a vehicle, based on the state of a traffic light in front of the vehicle, the position of the traffic light, or the position of a preceding vehicle through V2I communication.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. An apparatus for controlling a transmission of a vehicle, the apparatus comprising:
    a determination device configured to determine whether to perform speed following control based on state information of a traffic light positioned on a road in front of the vehicle in coasting;
    a stop position predicting device configured to predict a stop position of the vehicle based on position information of the vehicle and the traffic light;
    a transmission stage decision device configured to determine a target position and a target speed based on the predicted stop position, and to form a speed profile for each transmission stage to determine a final transmission stage based on the target position and the target speed; and
    a controller configured to perform speed following transmission control based on the final transmission stage.

2. The apparatus of claim 1, wherein the determination device determines whether to perform speed following control or neutral driving control by considering a predicted time at which the vehicle arrives at the stop position and a predicted time at which a state of the traffic light is switched based on state information of a present traffic light, state information of a next traffic light, and a distance between the vehicle and the traffic light.

3. The apparatus of claim 2, wherein the determination device determines the speed following control to be performed and the neutral driving control to be selectively allowed when a present signal of the traffic light is in red and a predicted next signal of the traffic light is in red.

4. The apparatus of claim 2, wherein the determination device determines the speed following control to be performed and the neutral driving control to be selectively allowed when a present signal of the traffic light is in red, a predicted next signal of the traffic light is in green, and a predicted time in which the vehicle arrives at the stop position is shorter than or equal to a predicted time in which the traffic light is changed to be in green.

5. The apparatus of claim 2, wherein the determination device determines the speed following control to be performed and the neutral driving control to be selectively allowed when a present signal of the traffic light is in green, a predicted next signal of the traffic light is in red, and a predicted time in which the vehicle arrives at the stop position is longer than a predicted time in which the traffic light is changed to be in red.

6. The apparatus of claim 2, wherein the determination device determines the speed following control not to be performed and the neutral driving control to be prohibited when a present signal of the traffic light is in red, a predicted next signal of the traffic light is in green, and a predicted time in which the vehicle arrives at the stop position is longer than a predicted time in which the traffic light is changed to be in green.

7. The apparatus of claim 2, wherein the determination device determines the speed following control not to be performed and the neutral driving control to be constantly performed when a present signal of the traffic light is in green, a predicted next signal of the traffic light is in red, and a predicted time in which the vehicle arrives at the stop position is shorter than or equal to a predicted time in which the traffic light is changed to be in red.

8. The apparatus of claim 2, wherein the determination device determines the speed following control not to be performed and the neutral driving control to be constantly performed when a present signal of the traffic light is in green and a predicted next signal of the traffic light is in green.

9. The apparatus of claim 1, wherein the stop position predicting device determines a distance between the vehicle and the traffic light as a predicted stop distance when there is no preceding vehicle between the vehicle and the position of the traffic light, and determines the predicted stop position based on the predicted stop distance.

10. The apparatus of claim 1, wherein the stop position predicting device determines a distance between the vehicle and a preceding vehicle as a predicted stop distance when there is a preceding vehicle between the vehicle and the position of the traffic light, and determines the predicted stop position based on the predicted stop distance.

11. The apparatus of claim 1, wherein the transmission stage decision device sets, as the target position, a position obtained by subtracting an offset distance from the predicted stop position.

12. The apparatus of claim 1, wherein the transmission stage decision device determines, the final transmission stage, a transmission stage corresponding to the target position and the target speed in the speed profile for the each transmission stage.

13. The apparatus of claim 1, wherein the controller is configured to:
perform neutral control from a present position of the vehicle to a predicted gear shifting position; and perform gear shifting depending on the determined final transmission stage when the vehicle arrives at the predicted gear shifting position.

14. The apparatus of claim 1, wherein the vehicle includes an automatic transmission, a continuously variable transmission (CVT), or a multi-stage reducer.

15. A method for controlling a transmission of a vehicle, the method comprising the steps of:
determining whether to perform speed following control based on state information of a traffic light positioned on a road in front of the vehicle in coasting;
predicting a stop position of the vehicle based on position information of the vehicle and the traffic light;
determining a target position and a target speed based on the predicted stop position, and forming a speed profile for each transmission stage to determine a final transmission stage based on the target position and the target speed; and
performing speed following transmission control based on the final transmission stage.

16. The method of claim 15, wherein the step of determining of whether to perform speed following control includes the step of:
determining whether to perform the speed following control or neutral driving control by considering a predicted time at which the vehicle arrives at the stop position and a predicted time at which a state of the traffic light is switched based on state information of a present traffic light, state information of a next traffic light, and a distance between the vehicle and the traffic light.

17. The method of claim 16, wherein the step of determining of whether to perform the speed following control includes the step of:
determining the speed following control to be performed and the neutral driving control to be selectively allowed when a present signal of the traffic light is in red and a predicted next signal of the traffic light is in red.

18. The method of claim 16, wherein the step of determining of whether to perform the speed following control includes the step of:
determining the speed following control to be performed and the neutral driving control to be selectively allowed when a present signal of the traffic light is in red, a predicted next signal of the traffic light is in green, and a predicted time in which the vehicle arrives at the stop position is shorter than or equal to a predicted time in which the traffic light is changed to be in green.

19. The method of claim 16, wherein the step of determining of whether to perform the speed following control includes the step of:
determining the speed following control to be performed and the neutral driving control to be selective allowed when a present signal of the traffic light is in green, a predicted next signal of the traffic light is in red, and a predicted time in which the vehicle arrives at the stop position is longer than a predicted time in which the traffic light is changed to be in red.

20. The method of claim 16, wherein the step of determining of whether to perform the speed following control includes the step of:
determining the speed following control no to be performed and the neutral driving control to be prohibited when a present signal of the traffic light is in red, a predicted next signal of the traffic light is in green, and a predicted time in which the vehicle arrives at the stop position is longer than a predicted time in which the traffic light is changed to be in green.

21. The method of claim 16, wherein the step of determining of whether to perform the speed following control includes the step of:
determining the speed following control not to be performed and the neutral driving control to be constantly performed when a present signal of the traffic light is in green, a predicted next signal of the traffic light is in red, and a predicted time in which the vehicle arrives at the stop position is shorter than or equal to a predicted time in which the traffic light is changed to be in red.

22. The method of claim 16, wherein the step of determining of whether to perform the speed following control includes the step of:
determining the speed following control not to be performed and the neutral driving control to be constantly performed when a present signal of the traffic light is in green and a predicted next signal of the traffic light is in green.

23. The method of claim 15, wherein the step of predicting of the stop position includes the steps of:
determining a distance between the vehicle and the traffic light as a predicted stop distance, when there is no preceding vehicle between the vehicle and the position of the traffic light; and
determining the predicted stop position based on the predicted stop distance.

24. The method of claim 15, wherein the step of predicting of the stop position includes the steps of:
determining a distance between the vehicle and the traffic light as a predicted stop distance, when there is a preceding vehicle between the vehicle and the position of the traffic light; and
determining the predicted stop position based on the predicted stop distance.

25. The method of claim 15, wherein the step of determining of the final transmission stage includes the step of:
setting, as the target position, a position obtained by subtracting an offset distance from the predicted stop position.

26. The method of claim 15, wherein the step of determining of the final transmission stage includes the step of:
determining, a final transmission stage, a transmission stage corresponding to the target position and the target speed in the speed profile for the each transmission stage.

* * * * *